(12) United States Patent
Tsirline et al.

(10) Patent No.: US 7,425,887 B2
(45) Date of Patent: Sep. 16, 2008

(54) MULTI-LAYERED EFFICIENT RFID COUPLER

(75) Inventors: Boris Y. Tsirline, Libertyville, IL (US); Karl Torchalski, Arlington Heights, IL (US); Robert Gawelczyk, Chicago, IL (US)

(73) Assignee: ZIH Corporation, Hamilton (BM)

( * ) Notice: Subject to any disclaimer, the term of this patent is extended or adjusted under 35 U.S.C. 154(b) by 541 days.

(21) Appl. No.: 11/231,391

(22) Filed: Sep. 21, 2005

(65) Prior Publication Data

US 2007/0063843 A1 Mar. 22, 2007

(51) Int. Cl.
*H04Q 5/22* (2006.01)
(52) U.S. Cl. .................. 340/10.1; 340/572.1; 340/10.5; 340/572.4
(58) Field of Classification Search ............ 340/505, 340/572.1, 10.1
See application file for complete search history.

(56) References Cited

U.S. PATENT DOCUMENTS

| | | | |
|---|---|---|---|
| 4,922,259 A | 5/1990 | Hall et al. | |
| 5,825,263 A | 10/1998 | Falt | |
| 5,898,405 A | 4/1999 | Iwasaki | |
| 5,903,239 A | 5/1999 | Takahashi et al. | |
| 6,097,347 A | 8/2000 | Duan et al. | |
| 6,177,872 B1 | 1/2001 | Kodukula et al. | |
| 6,215,402 B1 | 4/2001 | Rao Kodukula et al. | |
| 6,839,030 B2 | 1/2005 | Noujeim | |
| 6,848,616 B2 | 2/2005 | Tsirline et al. | |
| 6,899,476 B1 | 5/2005 | Barrus et al. | |
| 2005/0045723 A1 | 3/2005 | Tsirline et al. | |
| 2005/0045724 A1 | 3/2005 | Tsirline et al. | |

FOREIGN PATENT DOCUMENTS

WO WO 2005/022445 3/2005

OTHER PUBLICATIONS

L.O. McMillan, N.V. Shuley and P.W. Davis; *Leaky Fields on Microstrip*; Progress In Electromagnetics Research; PIER 17; 1997; pp. 323-337.
International Search Report for corresponding International Application No. PCT/US2006/036392 completed Jan. 24, 2007.

*Primary Examiner*—George A Bugg
*Assistant Examiner*—Travis R Hunnings
(74) *Attorney, Agent, or Firm*—Alston & Bird LLP (57) ABSTRACT

A RFID coupler capable of selectively communicating with a targeted transponder from among a group of multiple adjacent transponders. The coupler includes a grounded terminal load, a coupling element, a connecting element, an impedance matching element, and an input terminal. The coupling element is connected with the grounded terminal load and is configured to couple with the transponder by emanating an electromagnetic field. The input terminal is connected to a transceiver for receiving communication signals. The impedance matching element is connected to the input terminal and is configured to substantially match an input impedance of the coupler to a source impedance of the transceiver. The connecting element connects the impedance matching element to the coupling element. The coupling element and the impedance matching element are substantially parallel and separated by at least one dielectric layer and at least one ground plane.

20 Claims, 6 Drawing Sheets

MULTI-LAYERED EFFICIENT RFID COUPLER

BACKGROUND OF THE INVENTION

1) Field of the Invention

The present invention relates to RFID couplers and, in particular, to spatially selective couplers capable of selectively communicating with a targeted transponder from among a group of multiple adjacent transponders.

2) Description of Related Art

Radio frequency identification technology ("RFID") allows wireless communication between an RF transceiver-reader or other similar device and one or more active or passive transponders. Active transponders are powered by a battery or other self contained power unit that is provided within the transponder and used as a DC source for conversion to RF energy. Alternatively, passive transponders draw energy from an electromagnetic field provided by an antenna or coupler of the RF transceiver. Various commands, data, or other information may be relayed between the RF transceiver and the transponders using a predefined "air interface" RF signaling protocol.

When multiple passive transponders are within range of RF transceiver's antenna they will each be energized and may simultaneously attempt to communicate with the transceiver, thus, potentially causing errors in "reading" or "writing" to one or more of the transponders. This is especially problematic in applications such as RFID printer-encoders.

In general, RFID printer-encoders are systems capable of printing and encoding RFID-enabled labels, tickets, tags, cards or other media "on demand." These printer-encoders have a transceiver for communicating with the transponders embedded within or attached to individual media units. In various applications, it is highly desirable to present the individual media units on rolls or other structures in which the transponders are closely spaced. However, as referenced above, spacing passive transponders in relatively close proximity makes it more difficult to serially communicate with each transponder without simultaneously activating and communicating with neighboring transponders on other parts of the media roll.

To alleviate this problem, some techniques have focused on dispersing passive transponders embedded within or attached to carrier substrates such as labels, tickets, tags or other media supplied in bulk rolls, Z-folded stacks or other formats. For example, many applications provide passive transponders dispersed along media units or labels having sufficient length (or width) such that only one passive transponder is disposed within a given electromagnetic field at any even given time. Predictably, however, such dispersed configurations result in excessive media or carrier material costs. Further, winding or folding such dispersed labels into Z-folded stacks requires an increased packaging volume within the printer-encoder or other system as compared to standard length media rolls or stacks. Finally, widely dispersing passive transponders by providing longer labels or increased spacing between transponders may also slow overall printer-encoder throughput.

Anti-collision management techniques exist that allow near simultaneous reading and writing to numerous closely grouped transponders in a common RF electromagnetic field. However, such anti-collision management techniques often increase RFID system complexity, cost, and delay response. Furthermore, anti-collision management techniques are generally "blind" in that they do not recognize where a targeted passive transponder is physically located in the RF electromagnetic field. Systems incorporating such techniques would be less than desirable for printer-encoder applications as they have difficulty determining, for example, which passive transponder is located proximate the printhead of a printer-encoder. Accordingly, common objectives such as correlating information that is printed and encoded to a given label would prove highly difficult under standard anti-collision management techniques.

One way to prevent passive transponder read/write errors without using anti-collision management techniques is to electromagnetically isolate a specific transponder of interest from nearby transponders. Previously, electromagnetic isolation of physically adjacent transponders required passing transponders individually through RF-shielded housings or anechoic chambers for targeted exposure to an interrogating RF electromagnetic field. Unfortunately, use of such housings or chambers adds additional cost to the RFID system, tasks the often limited space requirements within the RFID system, and generally requires significant physical separation of the passive transponders. Furthermore, such housings or chambers are typically configured for media units of a particular type or size and such housing or chambers are generally not replaceable. Thus, operators which to print and encode media units of different types or shapes are often forced different printers/encoders.

Figure 1A:
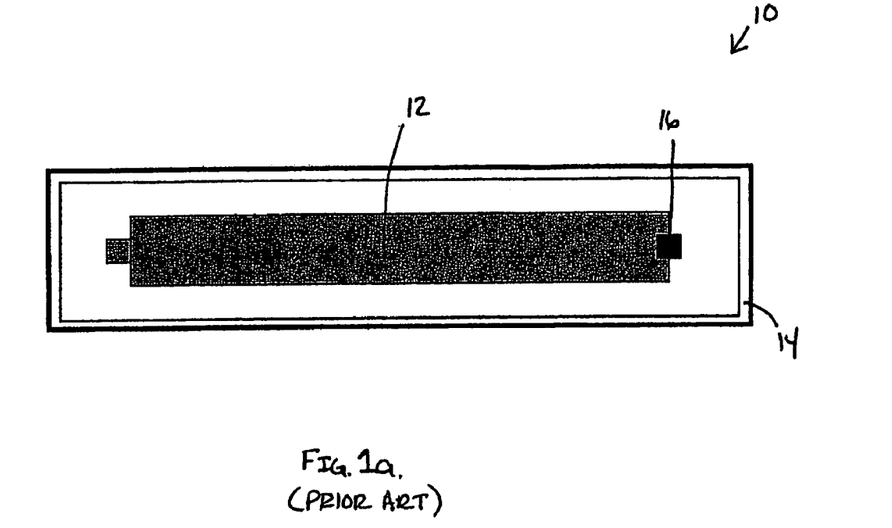
FIG. 1a is a top view of a prior art microstrip forward wave coupler.
Figure 1B:
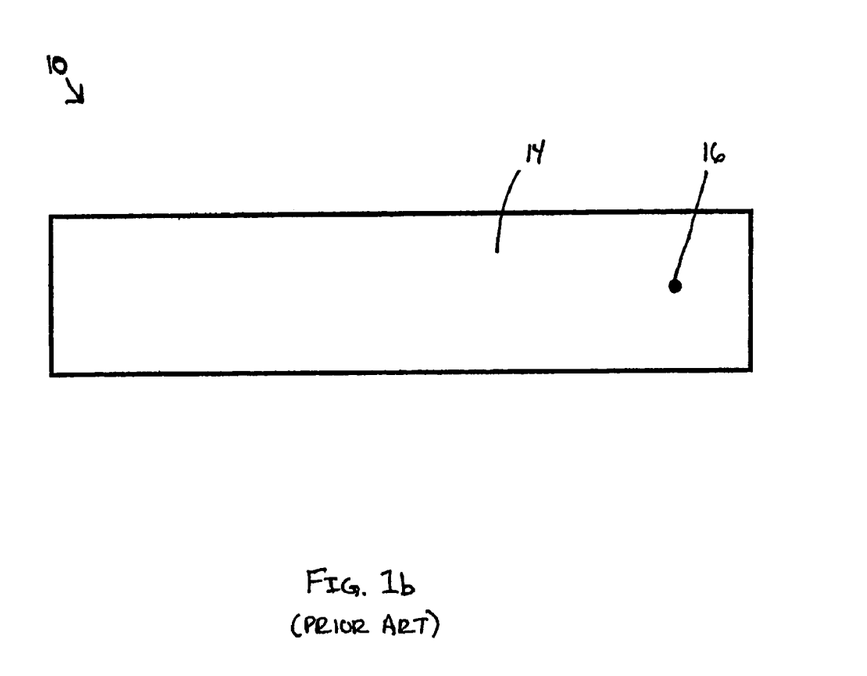

Another known technique for selectively communicating with a specific transponder is controlling the strength or range of the electromagnetic field emanating from the transceiver's antenna. Typically, a transceiver is connected to a coupler or antenna. The transceiver generates the signal and the coupler is configured to broadcast the signal as an electromagnetic field. According to this technique, the coupler is configured to emit the signal within a limited range and directed to a specific targeted area. In theory, limiting the signal reduces the chance that additional transponders outside the targeted area will be activated. An exemplary short-range coupler is a one-half wavelength microstrip coupler, as generally described in U.S. patent application Ser. No. 10/981,967, hereby incorporated herein by reference. In general, the coupler 10 is based on a band pass filter (BPF) using ½ microstrip transmission line terminated by a 50 ohm resistor. Typically, as shown in FIGS. 1a and 1b, such couplers 10 includes a rectangular conductive strip 12 disposed upon a printed circuit. One end of the conductive strip 12 is connected to the transceiver and the other end is connected through a terminal load 16 to the ground plane layer 14. The conductive strip 12 is generally of sufficient width to produce adequate electromagnetic field strength for coupling to a targeted passive transponder.

However, conventional microstrip couplers and other couplers configured for short range communication are not without problems. For example, a coupler similar to that illustrated in FIGS. 1a and 1b may require a relatively high level of power to over an inherent low power efficiency and to ensure reliable activation and communication between a coupler and a transponder separated by even relatively short distances. The low power efficiency typically is caused from an inherent mismatch between the transponder's antenna impedance and the coupler's wave impedance. Impedance mismatch often stems from differing design criteria for the transponder and the coupler. For example, in many applications the transponder's antenna impedance may be set for maximum performance in far field electromagnetic transmissions (e.g., approximately 377 ohms) of the type expected during retail or industrial end use of the transponder. Alternatively, the coupler's wave impedance may be dictated by spatial selectively requirements for near field communications and further its RF port should match the standard impedance of the transceiver's RF port which is typically 50 ohms.

Figure 2A:
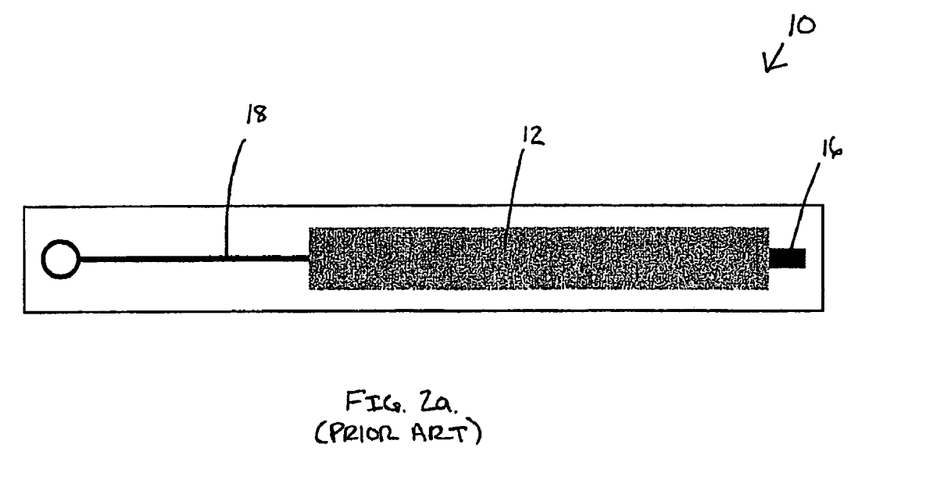
FIG. 2a is a top view of a prior art microstrip forward wave coupler having a quarter wave impedance transformer.
Figure 2B:
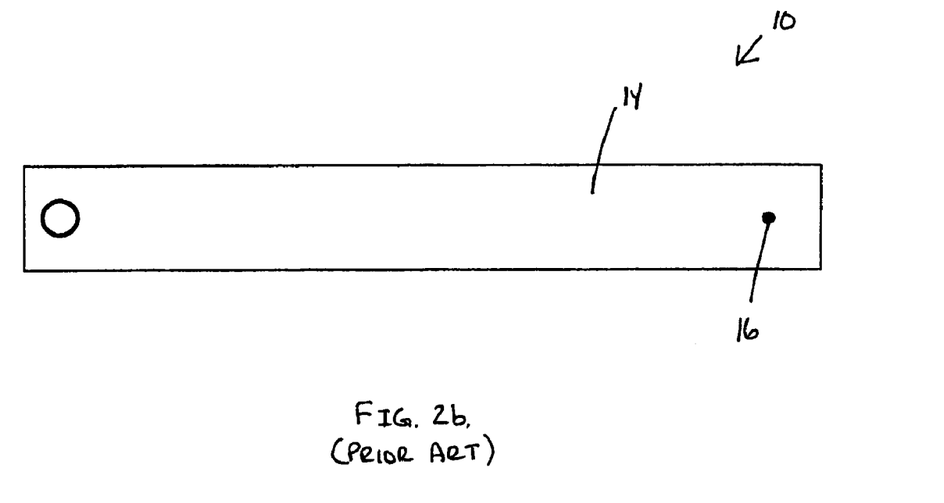

In non-printer-encoder applications impedance matching for a coupler based on a microstrip line has been addressed through the use of a conventional quarter wavelength transmission line 18, as shown in FIGS. 2a and 2b. However, to be effective, such quarter wavelength transmission lines generally must be relatively long for UHF band and not desirable in space-restricted systems such as UHF RFID enabled printer-encoder systems.

BRIEF SUMMARY OF THE INVENTION

The present invention addresses the above needs by providing an RFID system for selectively communicating with a targeted transponder from among a group of multiple adjacent transponders. The system includes a transponder conveyance, a transceiver, and a near field coupler. The transponder conveyance is for transporting one or more targeted transponders from a group of multiple adjacent transponders through a transponder operating region. The transceiver defines a source impedance and is configured to generate communication signals. The near field coupler defines an input impedance and is structured to be in electrical communication with the transceiver for receiving the communication signals.

The coupler includes a grounded terminal load, a coupling element, and an impedance matching element. The coupling element is in electrical communication with the grounded terminal load and configured to transmit a near field electromagnetic field having a wave impedance into the transponder operating region. The wave impedance is substantially equal to the impedance of the antenna of the transponder. The impedance matching element is in electrical communication with the coupling element and configured to substantially match the input impedance to the source impedance. The coupling element and the impedance matching element are structured in a substantially parallel stacked arrangement and separated by at least one dielectric layer and at least one ground plane. The coupling element and the impedance element may be substantially aligned so as to minimize the overall length of the coupler.

The impedance matching element may be one or more quarter wavelength microstrip sections. In case of multiple microstrip sections, the sections may be substantially coplanar and non-linear.

The input impedance may be approximately 50 ohms while the terminal load is greater than 50 ohms.

The RFID system may further include a printhead for printing indicia onto the one or more targeted transponders. For example, the printhead may be configured to engage the targeted transponder or transponders in the transponder operating region.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1b is a bottom view of the microstrip shown in FIG. 1a;

FIG. 2b is a bottom view of the microstrip shown in FIG. 2a;

FIG. 5b is a top view of the near-field UHF coupler shown in FIG. 5a;

FIG. 5c is a bottom view of the near-field UHF coupler shown in FIG. 5a.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

The present invention concerns an apparatus and method that enables an RFID transceiver (sometimes referred to as an "interrogator") to selectively communicate with a targeted transponder that is commingled among or positioned in proximity to multiple adjacent transponders. As will be apparent to one of ordinary skill in the art, various embodiments of the present invention are described below that do not require physical isolation of a given transponder through use of cumbersome shielded housings, anechoic chambers, or complex anti-collision management techniques.

Several embodiments of the present invention may be useful for reading, writing, or otherwise encoding passive transponders that are located on assembly lines, in inventory management centers where on-demand RFID labeling may be needed, or in other similar applications. In various embodiments, one or more transponders 26 are mounted to or embedded within a label, ticket, tag, card or other media form that may be carried on a liner or carrier. In alternate linerless embodiments, a liner or carrier may not be needed. In either case, such RFID enabled labels, tickets, tags, and other media forms are referred to collectively as "media units" 24. It is often desirable to print to a media unit 24 before, after, or during communication with its corresponding transponder 26.

Figure 3:
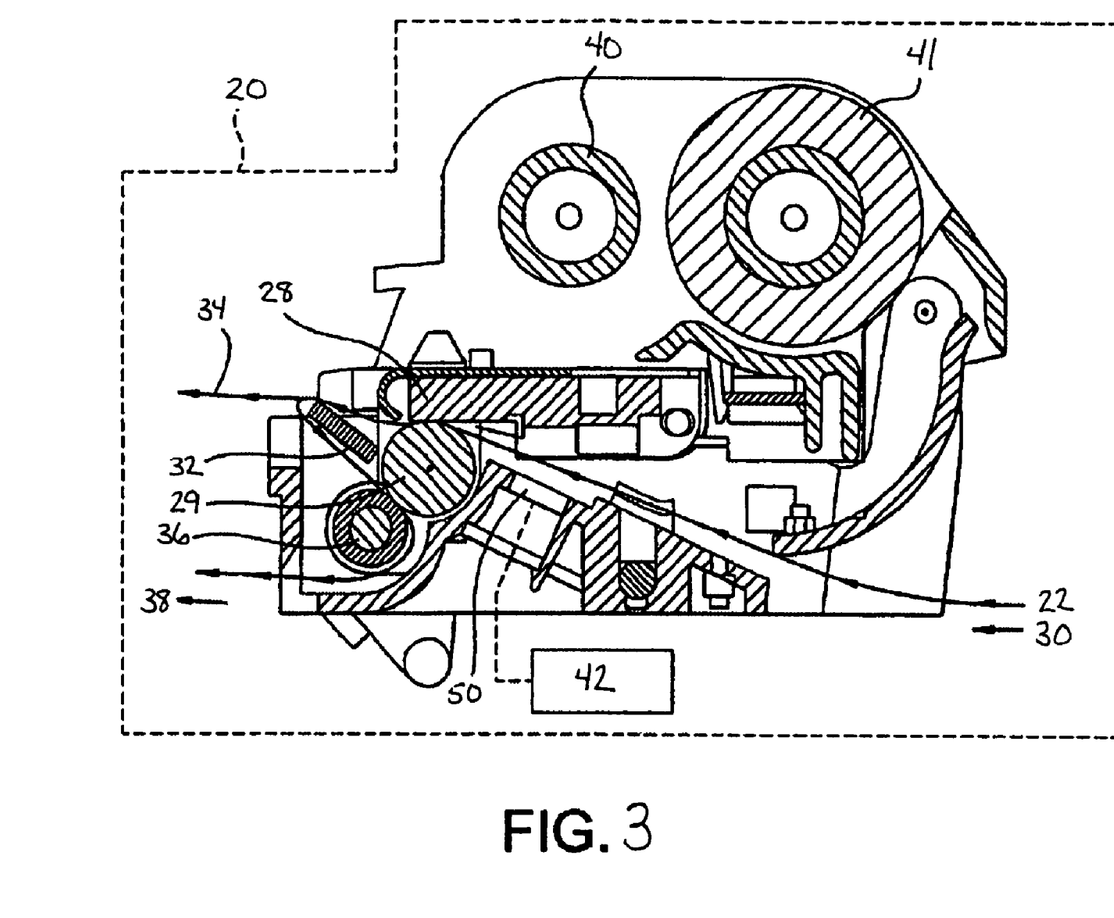
FIG. 3 is a side schematic view of a printer-encoder according to an embodiment of the present invention.
Figure 4:
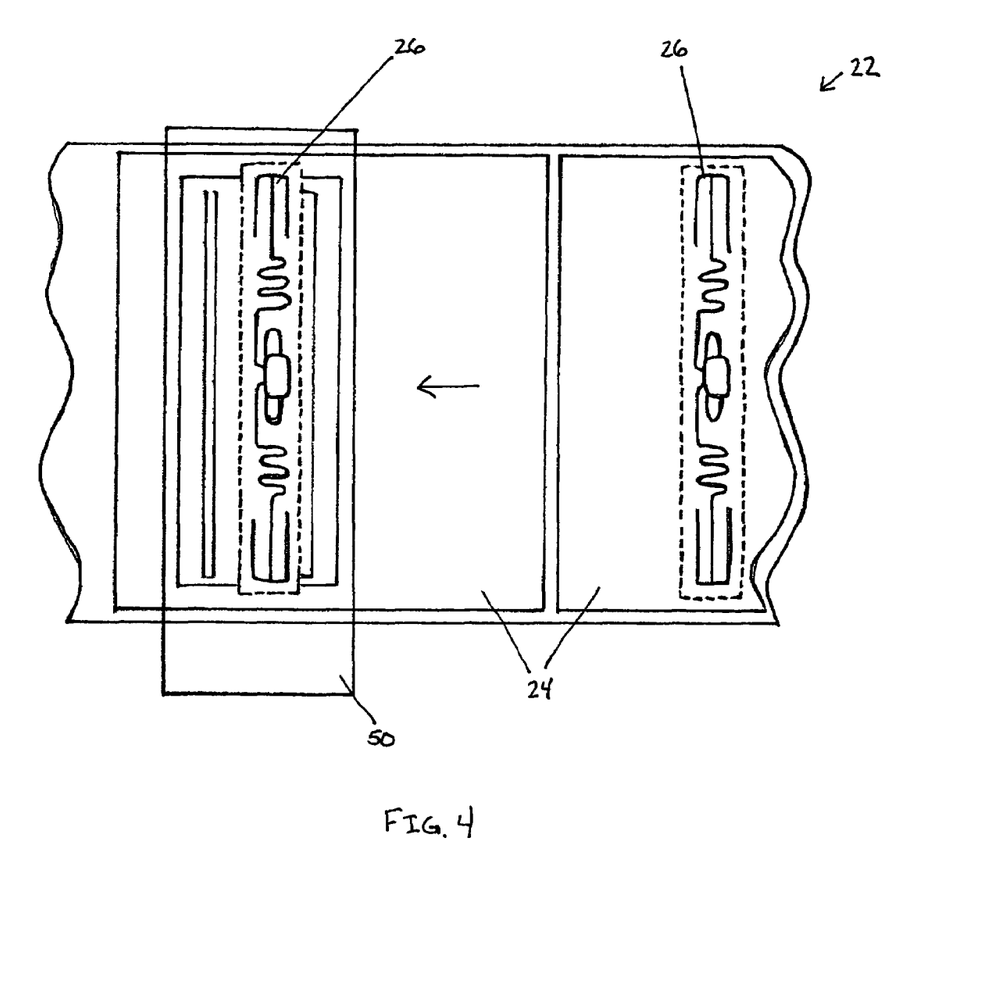
FIG. 4 is a partial top view of the media web over the coupler in FIG. 3 taken along line 4-4.
Figure 5A:
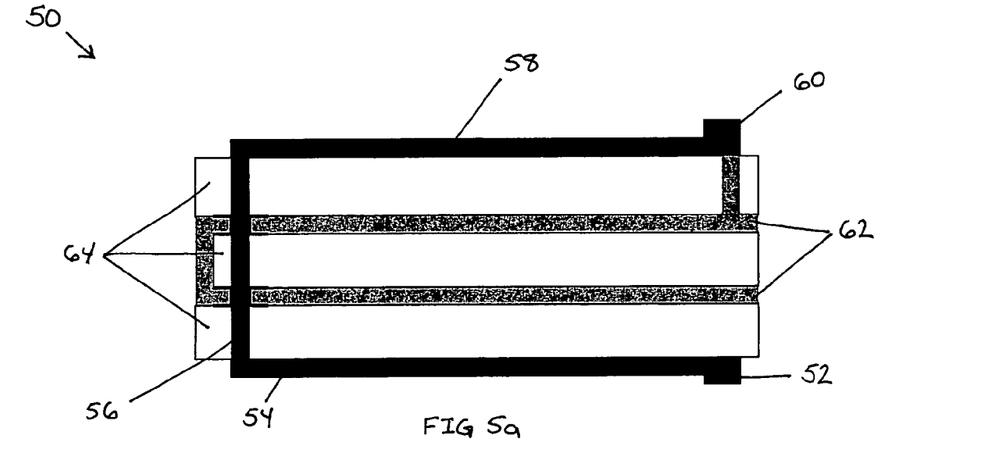
FIG. 5a is a cross-sectional view of a near-field UHF coupler according to another embodiment of the present invention.
Figure 5B:
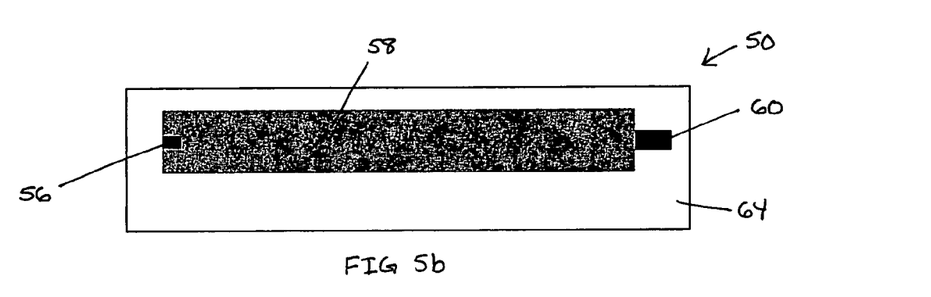
Figure 5C:
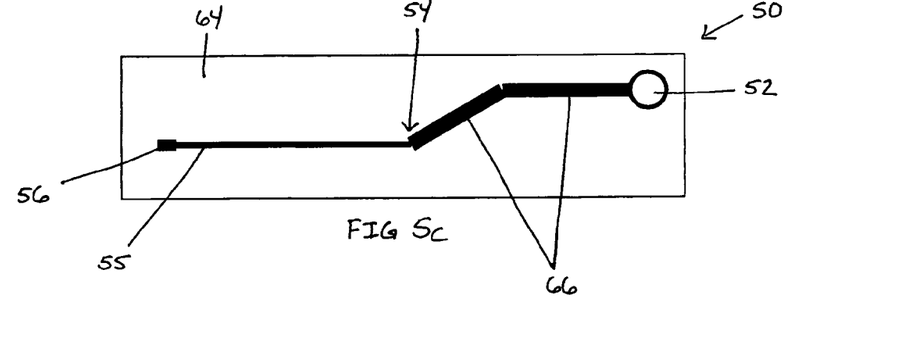

As shown in FIGS. 3-5, the present invention is directed to an RFID communication system comprising a near field coupler 50 that is capable of selectively communicating with a targeted transponder 26 positioned among a group of multiple adjacent transponders. In general, the coupler 50 defines an input impedance and includes a terminal load 60, a coupling element 58, a connecting element 56, an impedance matching element 54, and an input terminal 52. The terminal load 60 is grounded. The coupling element 58 is electrically connected with the grounded terminal load 60 and is configured to couple or communicate with the transponder 26 by emanating an electromagnetic field having a wave impedance. The input terminal 52 is electrically connected to a transceiver 42 for receiving communication signals from the transceiver 42. The impedance matching element 54 is electrically connected to the input terminal 52 and is configured to substantially match the input impedance of the coupler to a source impedance defined by the transceiver. The connecting element 56 electrically connects the impedance matching element 54 to the coupling element 58. The coupling element 58 and the impedance matching element 54 are structured in a substantially parallel stacked arrangement and separated by at least one dielectric layer 64 and at least one ground plane 62. For example, as illustrated in FIG. 5, the coupling element 58 and the impedance matching element 54 may be separated by three dielectric layers 64 and two ground planes 62.

The present invention has been depicted, for illustration purposes, in the context of a specific application, namely, RFID enabled printer systems, also referred to herein as "printer-encoders" (e.g., thermal transfer printers, direct thermal printers, inkjet, dot matrix, electro-photographic printers, etc.). Examples of RFID enabled printer systems are disclosed in U.S. Pat. Nos. 6,481,907 and 6,848,616, both of which are hereby incorporated herein by reference. However, in various other embodiments, the inventive concepts of the present invention may be applied to other RFID enabled systems in which it may be desirable to selectively communicate with a single passive transponder that is disposed among multiple adjacent passive transponders.

FIG. 3 illustrates an RFID printer-encoder 20 structured for printing and programming a series or stream of media units 24 according to one embodiment of the present invention. In the depicted embodiments, at least a few of the media units 24 include transponders 26. The printer-encoder 20 includes a printhead sub-assembly comprising a conventional printhead 28 and a platen roller 29. The depicted RFID enabled system is a thermal transfer printer, however, in alternate embodiments, as referenced above, the inventive concepts disclosed herein may be applied to other types of printers or non-printer systems. Also, although the typical printer-encoder operates within the UHF frequency band, the inventive concepts discloses herein may be applied to other systems operating in frequency bands other than UHF.

As best seen in FIGS. 3 and 4, the individual media units 24 are connected by a carrier substrate that combines with the media units 24 to form a web 22. The web 22 is directed along a feed path 30 under the printhead 28 for "on-demand" printing of indicia such as text, bar codes, or graphics. Such on-demand printing operations are generally controlled by a computer or microprocessor (not shown).

After printing, the media units 24 disposed on the web 22 proceed to a media exit path 34 where they are typically individually removed from the web 22. For example, pre-cut media units 24 may be simply peeled from an underlying carrier substrate of the web 22 at a peeler bar 32 as shown. In other embodiments, non-cut media units 24 may be peeled and transmitted downstream to an in-line cutter (not shown). Various other known media unit removal techniques may be used as will be apparent to one of ordinary skill in the art. In applications, such as the depicted embodiment, in which the media units 24 are supported by a carrier substrate the carrier substrate may be guided out of the printer-encoder 20 along a carrier exit path 38 by a roller 36 as shown. As is further apparent, the depicted printer-encoder 20 also includes a ribbon supply roll 41 and a take-up spool 40 for delivering a thermal transfer ribbon (not shown for clarity) between the printhead 28 and the media units 24 on web 22.

In accordance with an aspect of the present invention, the RFID printer-encoder 20 includes a transceiver 42 for generating RF communication signals that are fed to a spatially selective microstrip near field coupler 50 located proximate the media feed path 30. For purposes of the present specification and appended claims the transceiver 42 and the near field coupler 50 will be referred to as collectively forming at least a part of a communication system. As will be explained in more detail below, the communication system forms an electromagnetic field in proximity to a transponder operating region. The communication system is configured to establish, at predetermined transceiver power levels, a mutual coupling between the transceiver 42 and a selected transponder 26 of a media unit 24 that is located in the transponder operating region.

As the media units 24 and their transponders 26 move along the media feed path 30 through the transponder operating region, data may be read from and or written to each transponder 26. Indicia such as text, bar-codes, graphics, and the like then may be printed to an external surface of the media units 24 as the media units 24 pass between the platen roller 29 and the printhead 28. Various techniques for printing indicia to the media units and devices for transmitting or conveying a web 22 comprising media units through a printer-encoder are known in the art and, thus, such techniques and conveyance devices are not described in detail.

A near field coupler 50, according to one embodiment of the present invention, will now be described with reference to FIGS. 5a through 5c. The depicted near field coupler 50 includes an input terminal 52, an impedance matching element 54, a connecting element 56, a coupling element 58, a terminal load 60, one or more ground planes 62, and more than one dielectric layers 64. In the depicted embodiment, the elements 54, 56, 58, 60, 62 of the coupler 50 are arranged electrically in series. The input terminal 52 connects the transceiver 42 directly (or indirectly through a transmission line) to the coupler 50. For example, the input terminal 52 may be a "RF port" as known in the art. In particular, the transceiver 42 is configured to send a source electrical signal to the coupler 50 through the input terminal 52. The signal passes through the input terminal 52, the impedance matching element 54, the connecting element 56, the coupling element 58, and into the terminal load 60, which is connected to a ground layer 62.

As the electrical signal passes through the coupler 50, it generates a near field electromagnetic field that may be adapted to couple the coupler 50 to a transponder 26 disposed proximate the transponder operating region. A more detailed description of one exemplary near field electromagnetic field is provided in "Leaky Fields on Microstrip" L. O. McMillian et al. Progress in Electromagnetics Research, PIER 17, 323-337, 1997; U.S. patent application Ser. No. 10/604,996; and U.S. patent application Ser. No. 10/707,895; each of which is hereby incorporated by reference in the entirety. Because the near field electromagnetic field is relatively local to the coupler 50 and degrades, at an exponential rate, with increasing distance from the coupler 50, the resulting range of the coupler 50 is generally limited. This limited range reduces the likelihood that a given transceiver's signal will activate transponders 26 outside the transponder operating region.

Figure 6:
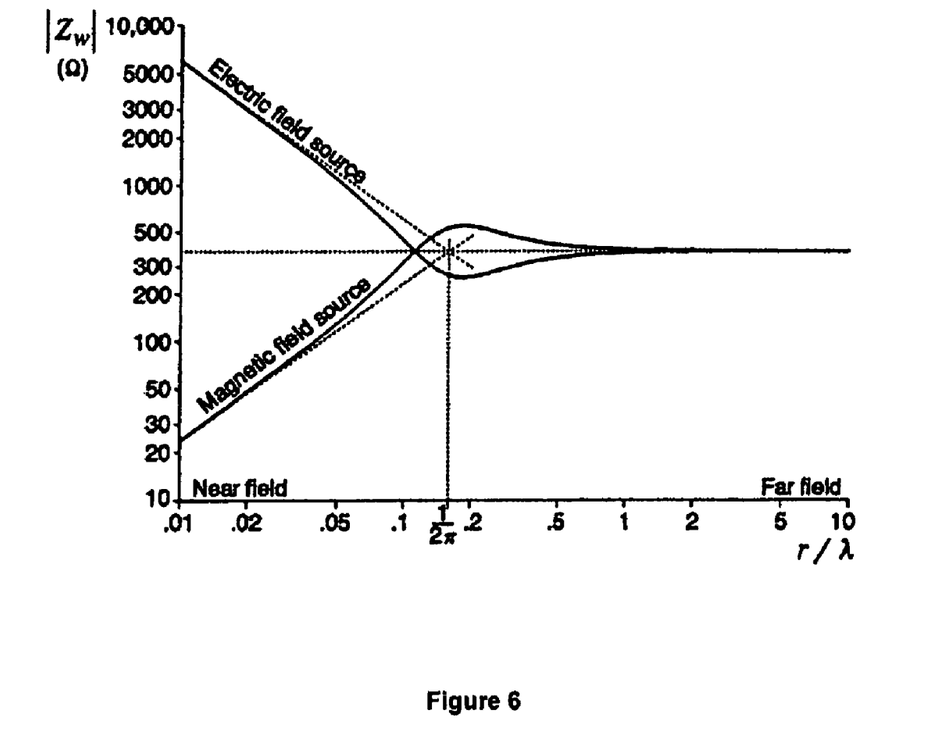
FIG. 6 is a graph illustrating wave impedance as a function of distance from the electric and magnetic field sources, i.e. the coupler.

In one aspect of the present invention, the coupler 50 is structured such that the wave impedance of the electromagnetic field transmitted from the coupler substantially matches the impedance of the antenna of the transponder 26. It is believed that due to the proximity of the coupler to the transponder (i.e. the transponder is within the near field range of the signal) the wave impedance of the field is a function of the structure of the coupler, including the terminal load, as illustrated in FIG. 6. Notably, as will be apparent to one of ordinary skill in the art, the impedance of the transponder's antenna may vary depending on the intended end-use (e.g. retail, commercial, inventory management, etc.) of the transponder 26. Relatively common antenna impedance levels for transponders range between 250-500 ohms.

As referenced above, it is desirable for the wave impedance to substantially match the impedance of the antenna of the transponder 26 and thereby reduce the power loss attendant to any communication between the coupler 50 and the transponder 26. However, structuring the coupler such that it produces a wave impedance that substantially matches the impedance of the transponder's antenna, e.g., by increasing the terminal load, may, in turn, create an impedance mismatch between the transceiver and the coupler. Specifically, the transceiver 42 and its related circuitry define a source impedance. The source impedance is often on the order of 50 ohms but may vary between applications. The coupler defines an input impedance which is generally the voltage/current ratio across the input terminal of the coupler. It is believed that, in a conventional microstrip coupler based on half-wavelength microstrip line (or multiple thereof), the input impedance is substantially equal to the terminal load at operational frequency. As referenced above, an impedance mismatch between any two components of a circuit, here, the transceiver and the coupler generally creates an undesirable power loss between the two.

In the depicted embodiment, the impedance matching element 54 is provided to substantially match the impedances between transceiver and the coupler. More specifically, the impedance matching element substantially matches the input impedance to the source impedance. The depicted impedance matching element 54 includes an odd number of quarter wavelength conductive strips or microstrip sections each having a matching impedance level ($Z_m$). As shown below, the value of such matching impedance levels is approximately equal to the square root of the product of the source impedance ($Z_0$) and the terminal load impedance ($Z_1$).

$$Z_m \approx \sqrt{(Z_0 Z_1)}$$

Once quantitatively determined, the matching impedance level ($Z_m$) of the microstrip sections can be set by appropriately defining the width of the conductive strip sections 55. Although not wishing to be bound by theory, it is a basic principle that the narrower the conductive strip sections 55 the higher the characteristic impedance.

As referenced above, in the illustrated embodiment, the coupling element 58 is disposed between the impedance matching element 54 and the terminal load 60. The coupling element 58 may be comprised of a conductive surface having a relatively large surface area. In various embodiments, the coupling element 58 may be positioned near the transponder operating region for converting electrical signals supplied by the transceiver into an electromagnetic field having a wave impedance that is transmitted into the transponder operating region.

The depicted coupling element 58 is comprised of a rectangular shape microstrip. However, in alternate embodiments, the shape or type of the coupling element 58 may vary to include those antenna structures commonly known in the art. In several embodiments, the electromagnetic field generated by the coupling element originates from the edges of the coupling element. Furthermore, although not wishing to be bound by theory, it is believed that the strength of the electric fields emanating from the edges of the coupler element is proportionate to the width of the coupling element. However, it is also believed an increase in width of the coupling element decreases the bandwidth of the coupler.

In yet another embodiment, the coupling element 58 and the matching element 54 may be constructed from the same material in substantially the same manner. For example, the matching element 54 and coupling element 58 may represent different regions of a copper conductive strip or microstrip with differing widths (and thus differing impedances).

Another aspect of the present invention concerns the spatial relationship between the impedance matching element 54 and the coupling element 58. It is generally preferable, especially in space-limited applications such as printer-encoder systems, for the impedance matching element 54 and the coupling element 58 to be configured in a manner that reduces the overall length of the coupler 50. FIGS. 5a-5c depict a coupler 50 according to one embodiment of the present invention wherein the structures of the impedance matching element 54 and the coupling element 58 are packaged in a relatively compact design. More specifically, the impedance matching element 54 and the coupling element 58 are disposed in a substantially parallel arrangement and separated by a number of dielectric layers 64 and ground planes 62 as shown. This structure essentially folds the overall length of the coupler 50 in half allowing for easier placement and packaging within the printer-encoder 20 or other interrogation device.

In the depicted embodiment, the impedance matching element 54 and coupling element 58 are substantially aligned, i.e., their ends are substantially aligned relative to one another, so as to minimize the overall length of the coupler 50. However, in alternate embodiments, the impedance matching element 54 and the coupling element 58 may be staggered relative to one another thereby forming a coupler 50 having a "stepped" shape. In various embodiments, the overall shape and size of the coupler may be to some degree determined by the space restrictions of the RFID enabled system. For example, here, the shape and size of the coupler 50 is determined in large part to the space restrictions of the printer-encoder 20.

As best seen in FIG. 5a, the impedance matching element 54 and the coupling elements 58 are connected in series by a connecting element 56 extending substantially perpendicular to the impedance matching element 54 and the coupling element 58. In one embodiment, the connecting element 56 is a simple via filled with a conductive material as known in the art. FIG. 5a also depicts a stacked structure comprised of alternating dielectric layers 64 and ground planes 62. In one embodiment, the dielectric layers 64 are made from a woven glass reinforced epoxy laminate dubbed "FR-4" or flame resistant 4. However, one in the art would appreciate that other dielectric materials may be used within this invention, including materials having a higher dielectric constant (or permittivity) than FR-4. A higher dielectric constant value may allow for a further decrease in the dimensions of the coupler 50, including the thicknesses of the dielectric layers 64. Examples of other dielectric materials include, but are not limited to, porcelain (ceramic), mica, glass, plastics, and the oxides of various metals, such as aluminum oxide.

As shown in FIG. 5c, the impedance matching element 54 may also include a microstrip extension 66. The microstrip extension 66 may include one or more sections. Each section having a characteristic impedance substantially equal to the source impedance (typically 50 ohms). Together the sections extend from the input terminal 52 to the first quarter wavelength conductive strip or microstrip section 55 having the matching impedance. Little power is lost between the extension 66 and the transceiver because they share substantially equal impedances. In general, the microstrip extension 66 functions as a transmission line from the transceiver 42 to the first quarter wave section 55. The microstrip extension 66 allows for the input terminal 52 to be placed in a location that is convenient for connecting the transceiver 42 to the coupler 50. More particularly, the microstrip extension 66 allows for the connection of the transceiver 42 and coupler 50 without displacing the quarter wavelength sections 55.

FIGS. 5b and 5c also illustrate the non-linear placement of the different sections of the impedance matching element 54. By placing adjacent sections at angles, the overall length of the impedance matching element 54 is reduced.

As described in detail above, various embodiments of the present invention are directed to RFID communication systems comprising a near field coupler that is capable of selectively communicating with a targeted transponder positioned among a group of multiple adjacent transponders. In general, the coupler includes a terminal load, a coupling element, a connecting element, an impedance matching element, and an input terminal. The impedance matching element is electrically connected to the input terminal and is configured to substantially match the impedances between the transceiver and the coupler. The connecting element electrically connects the impedance matching element to the coupling element. The coupling element and the impedance matching element are structured in a substantially parallel stacked arrangement and separated by at least one dielectric layer and at least one ground plane. For example, in one embodiment, the coupling element and the impedance matching element are separated by three dielectric layers and two ground planes.

RFID communication systems having near field couplers of the type described above are capable of interrogating individual transponders positioned among multiple adjacent transponders without the need for anti-collision management techniques or shielding components. Further, such systems require relatively little space and may be produced at relatively low cost. Finally, such communications may be adapted to operate effectively using relatively little in the way of power. Such advantages are useful in multiple communications and may be particularly useful in RFID printer-encoder systems.

It should be noted that in the above description, the term "coupler" is most often used to describe the device connected to the transceiver while the term "antenna" is most often used to describe the device connected to or part of the transponder. However, this is done only for clarification purposes and not as a limitation. One in the art would appreciate that the terms "antenna" and "coupler" are essentially interchangeable. Both generally describe devices or elements of devices that are configured to convert electromagnetic fields into electrical signals and electrical signals into electromagnetic fields.

Also, as used herein, the term "electrical communication" refers to elements or devices being connected or coupled to each other electronically. For example purposes only, and not as a limitation, electrical communication may include devices having contact-less or wireless communication with each other; being electromagnetically coupled to each other; or connected in series or parallel to each other within a circuit. Electrical communication may also refer to devices that are connected or coupled to each other via one or more intermediate devices or elements.

Many modifications and other embodiments of the invention set forth herein will come to mind to one skilled in the art to which this invention pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An RFID system for selectively communicating with a targeted transponder from among a group of multiple adjacent transponders, the system comprising:
   a transponder conveyance adapted to transport at least one targeted transponder from a group of multiple adjacent transponders through a transponder operating region;
   a transceiver configured to generate communication signals, said transceiver defining a source impedance; and
   a near field coupler structured in electrical communication with said transceiver for receiving the communication signals, said coupler defining an input impedance and including,
      a grounded terminal load,
      a coupling element in electrical communication with said grounded terminal load and configured to transmit a near field electromagnetic field into the transponder operating region, and
      an impedance matching element in electrical communication with said coupling element and configured to substantially match the input impedance to the source impedance,
      wherein said coupling element and said impedance matching element are structured in a substantially parallel stacked arrangement and separated by at least one dielectric layer and at least one ground plane.

2. The RFID system according to claim 1, wherein said coupling element and said impedance matching element are substantially aligned so as to minimize an overall length of said near field coupler.

3. The RFID system according to claim 1, wherein said impedance matching element is a quarter wavelength microstrip section.

4. The RFID system according to claim 1, wherein said impedance matching element is a plurality of quarter wavelength microstrip sections.

5. The RFID system according to claim 4, wherein said quarter wavelength microstrip sections are substantially coplanar and at least two microstrip sections are non-linear relative to each other.

6. The RFID system according to claim 1, wherein the source impedance is approximately 50 ohms and said terminal load is greater than 50 ohms.

7. The RFID system according to claim 1, further comprising a printhead for printing indicia onto the at least one targeted transponder.

8. The RFID system according to claim 7, wherein said printhead engages the at least one targeted transponder in the transponder operating region.

9. A coupler configured to couple a transceiver with a transponder, said coupler comprising:
   an input terminal structured to receive an input signal from the transceiver;
   a grounded terminal load,
   a coupling element electrically connected with said grounded terminal load and configured to couple with the transponder,
   an impedance matching element electrically connected with said input terminal and configured to substantially match an input impedance defined by said coupler to a source impedance defined by the transceiver, and
   a connecting element for electrically connecting said impedance matching element to said coupling element,
      wherein said coupling element and said impedance matching element are structured in a substantially parallel stacked arrangement and separated by at least one dielectric layer and at least one ground plane.

10. The coupler according to claim 9, wherein said coupling element and said impedance matching element are substantially aligned so as to minimize an overall length of the coupler.

11. A RFID printer-encoder for printing and programming a series of media units wherein at least one of the media units include at least one transponder; said printer-encoder comprising:
- a printhead for printing indicia onto the media units;
- a media conveyance adapted to transport the series of media units including the at least one transponder to said printhead and to a transponder operating region;
- a transceiver configured to generate communication signals, said transceiver defining a source impedance; and
- a near field coupler defining an input impedance, said near field coupler configured to receive the communications signals from the transceiver and selectively communicate with a transponder in the transponder operating region, said near field coupler includes a microstrip line extending from an input terminal to a terminal load, said microstrip line having at least a first region and a second region separated by a plurality of dielectric layers and at least one ground plane,
  - wherein the first region is configured to substantially match the input impedance to the source impedance and the second region is configured to generate a near field signal to couple with the transponder in the transponder operating region.

12. The RFID printer-encoder according to claim 11, wherein the first region and the second region are substantially aligned and substantially parallel so as to minimize an overall length of said near field coupler.

13. The RFID printer-encoder according to claim 11, wherein the first region forms one or more quarter wavelength microstrip sections.

14. The RFID printer-encoder according to claim 13, wherein the first region is partially non-linear.

15. The RFID printer-encoder according to claim 11, wherein the source impedance is approximately 50 ohms and said terminal load is greater than 50 ohms.

16. The RFID printer-encoder according to claim 11, wherein the second region being characterized by a comparatively low impedance relative to the first region.

17. The RFID printer-encoder according to claim 11, wherein the first region includes a matching impedance up to 800 ohms for substantially matching the source impedance and the input impedance.

18. The RFID printer-encoder according to claim 11, wherein the first region and the second region are separated by four layers of dielectric layers and two ground planes.

19. The RFID printer-encoder according to claim 17, wherein the dielectric layers include a FR-4 material.

20. The RFID printer-encoder according to claim 19, wherein the first region and the second region are connected by a via.

* * * * *